United States Patent [19]

Furlani et al.

[11] Patent Number: 5,606,387

[45] Date of Patent: Feb. 25, 1997

[54] ELECTROMAGNETIC CAMERA SHUTTER WITH A CONDUCTIVE STRIP ON THE BLADE AND A PERMANENT MAGNET APERTURE

[75] Inventors: Edward P. Furlani, Lancaster; Thomas M. Stephany, Churchville, both of N.Y.

[73] Assignee: Eastman Kodak Company, Rochester, N.Y.

[21] Appl. No.: 627,061

[22] Filed: Apr. 3, 1996

[51] Int. Cl.$^6$ .................................. G03B 9/08; G03B 9/36
[52] U.S. Cl. .................................. 396/470; 396/483
[58] Field of Search .................................. 354/226, 234.1, 354/245, 247, 248, 456

[56] References Cited

U.S. PATENT DOCUMENTS

| | | | |
|---|---|---|---|
| 3,282,187 | 11/1966 | Cassidy et al. | 354/227.1 |
| 3,987,473 | 10/1976 | Kondo | 354/234.1 |
| 4,024,552 | 5/1977 | Kondo | 354/234.1 |
| 4,051,499 | 9/1977 | Kondo | 354/234.1 |
| 4,054,892 | 10/1977 | Nakagawa et al. | 354/252 |
| 4,206,992 | 6/1980 | Theurer et al. | 354/235.1 |
| 4,208,110 | 6/1980 | Ito et al. | 354/429 |
| 4,265,530 | 5/1981 | Petersen | 354/463 |
| 4,269,493 | 5/1981 | Suzuki et al. | 354/459 |
| 4,319,211 | 3/1982 | Ueda et al. | 335/229 |
| 4,333,722 | 6/1982 | Lee | 354/234.1 |
| 4,344,687 | 8/1982 | Cloutier | 354/246 |
| 4,384,778 | 5/1983 | Lee et al. | 354/230 |
| 4,408,857 | 10/1983 | Frank | 354/234.1 |
| 4,504,132 | 3/1985 | Martin et al. | 354/195.1 |
| 4,505,563 | 3/1985 | Wong et al. | 354/234.1 |
| 4,514,065 | 4/1985 | Carrera | 354/235.1 |
| 4,671,638 | 6/1987 | Capobianco et al. | 354/234.1 |
| 4,696,560 | 9/1987 | Ogihara | 354/439 |
| 4,724,452 | 2/1988 | Mody et al. | 354/234.1 |

*Primary Examiner*—Safet Metjahic
*Assistant Examiner*—J. K. Han
*Attorney, Agent, or Firm*—Edward Dugas

[57] ABSTRACT

An improved electromagnetic camera shutter incorporating an electrically conductive shutter blade having a hole there through that is connected in series to a pair of electrically conductive springs to urge the shutter blade into a first or a second position from a compressed position between the first and the second positions.

A permanent magnet having a hole there through is positioned in proximity to the shutter blade such that the shutter covers the hole in the permanent magnet when the shutter is in the first or the second position.

A control means, for applying a current through the springs and the shutter blade in a first direction, generates an electromagnetic field between the shutter blade and the permanent magnet to move the shutter blade from the first position to the second position and for applying a current through the springs and the shutter blade in a second direction so as to move the shutter blade from the second position to the first position such that the hole in the shutter is positioned over the hole in the permanent magnet during transitions of the shutter between positions.

5 Claims, 3 Drawing Sheets

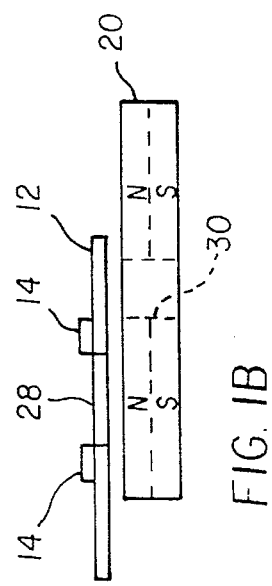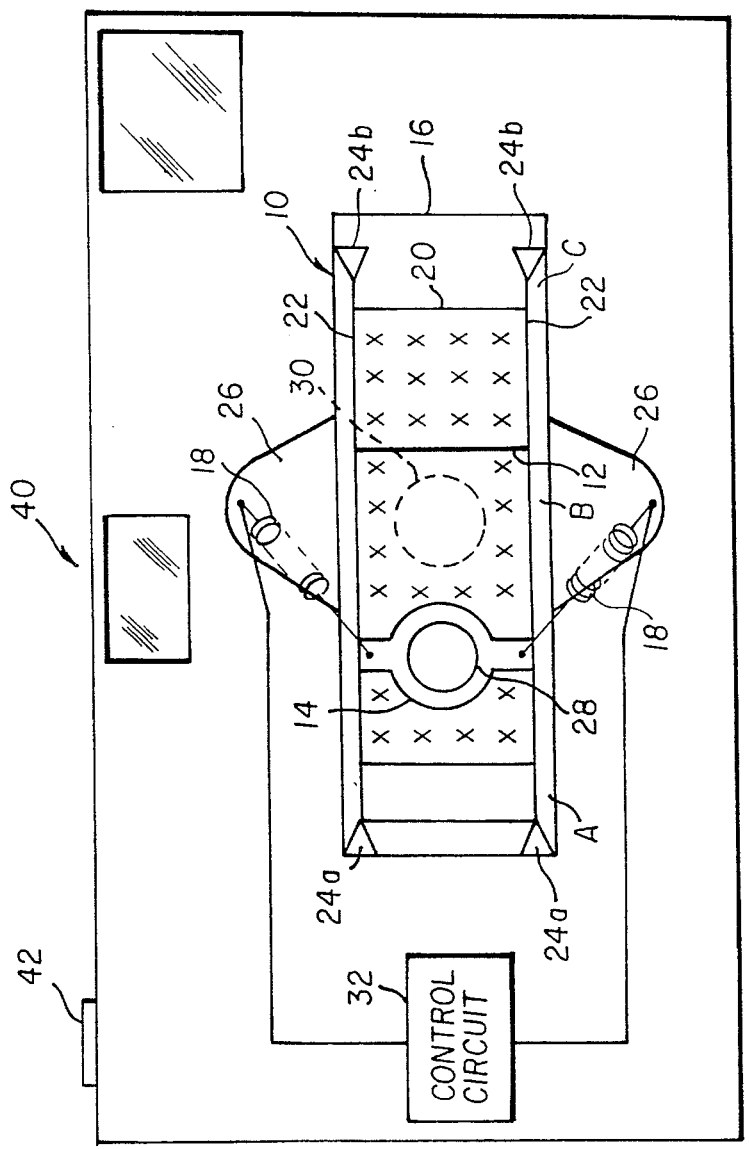
FIG. 1A
FIG. 1B

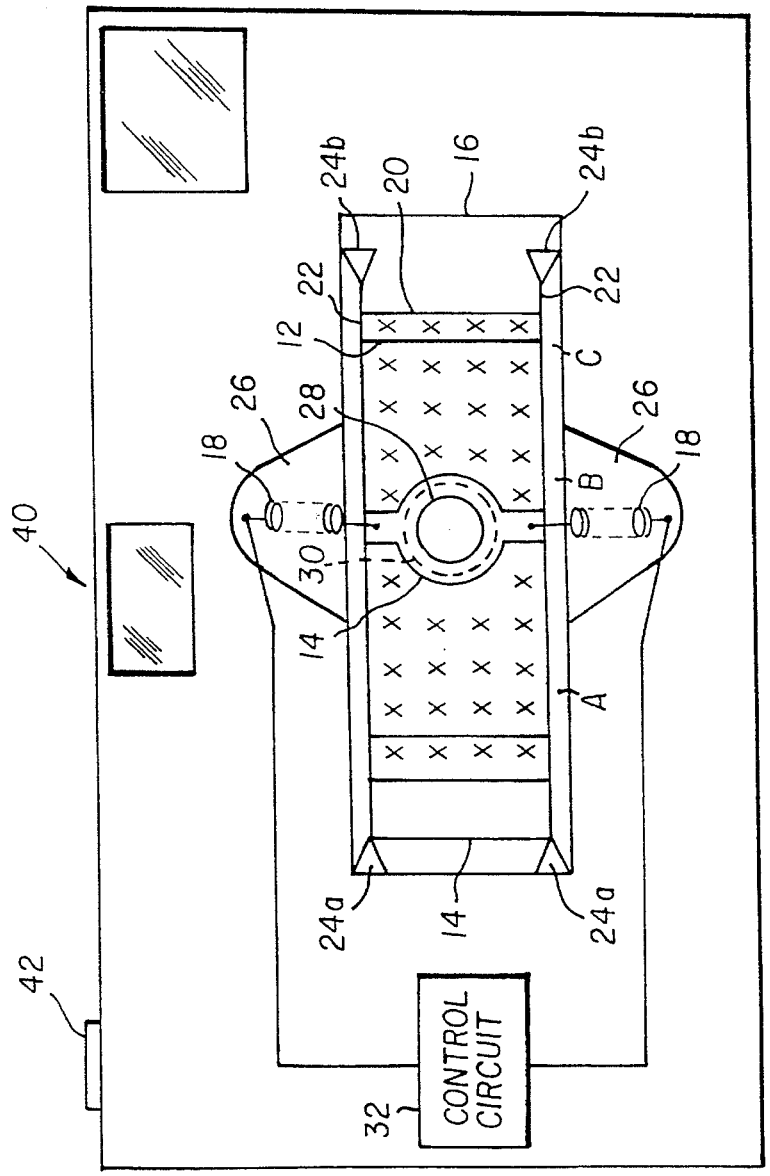
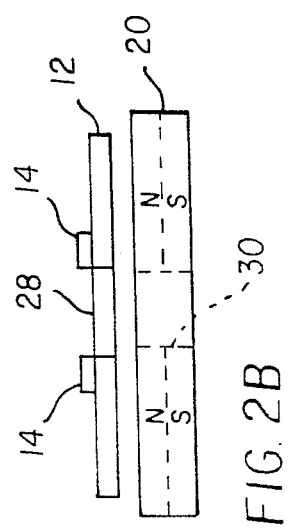
FIG. 2A
FIG. 2B

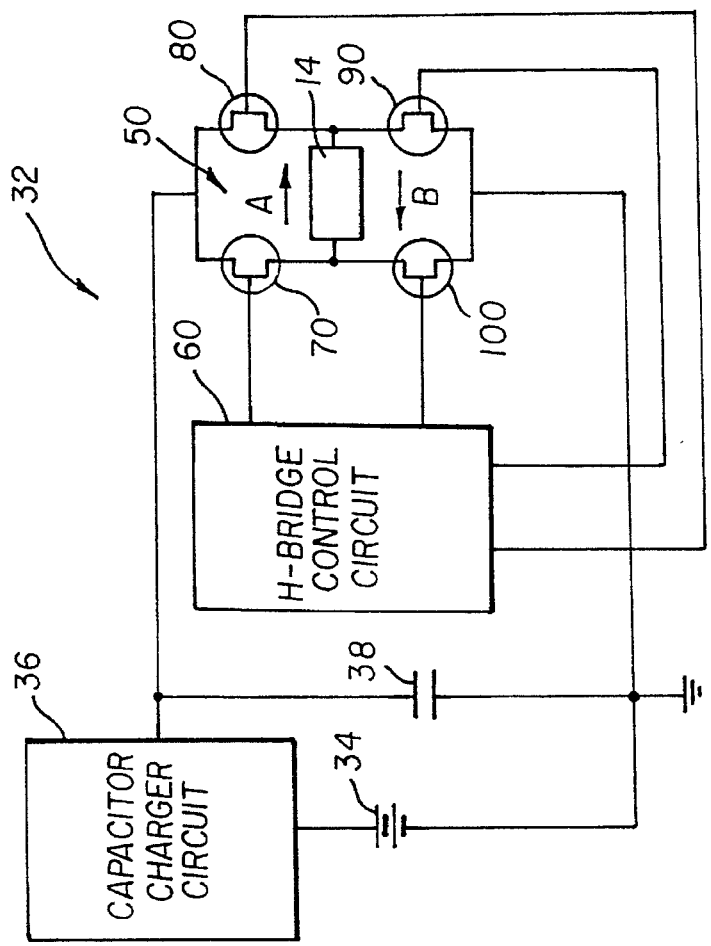
FIG. 4
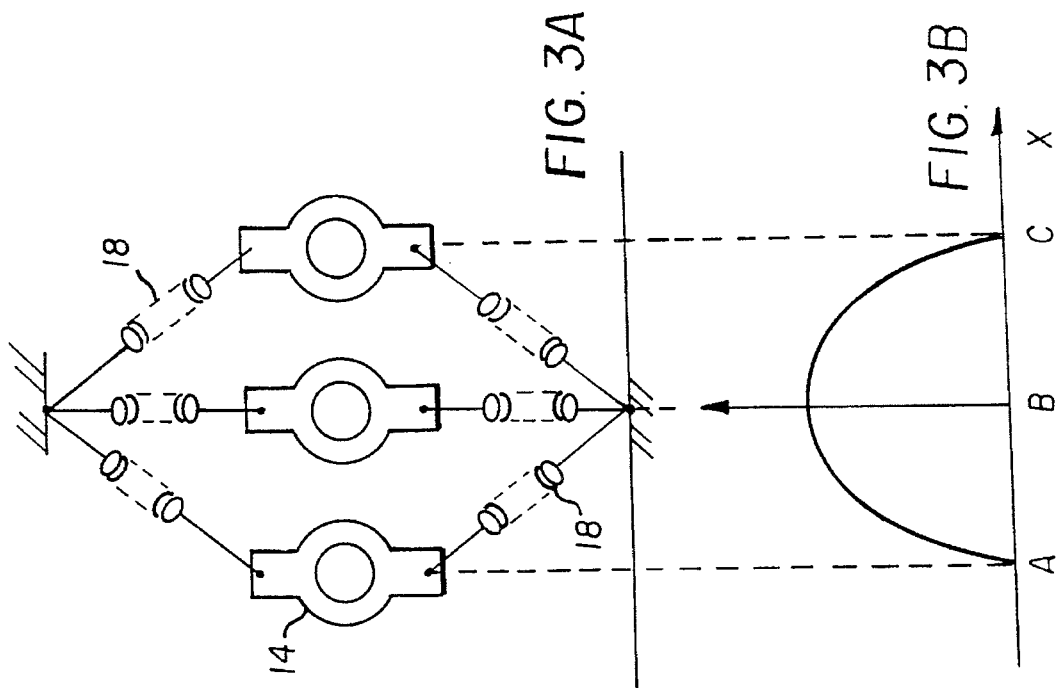
FIG. 3A
FIG. 3B

ELECTROMAGNETIC CAMERA SHUTTER WITH A CONDUCTIVE STRIP ON THE BLADE AND A PERMANENT MAGNET APERTURE

CROSS-REFERENCE TO RELATED APPLICATION

The present Application is related to U.S. patent application Ser. No. 60/001,137, filed Jul. 13, 1995, by Edward P. Furlani, et al., and entitled "Electromagnetic Camera Shutter."

FIELD OF THE INVENTION

This invention relates to the field of camera shutters and more particularly to an electromagnetic shutter.

BACKGROUND OF THE INVENTION

Electromagnetic actuators are routinely used for high speed camera shutters. These actuators typically consist of permanent-magnets, coils, and soft-magnetic materials that guide and focus the magnetic flux. The shutter blades are attached to a moving member which, in part, consists of a magnet or coil. The shutter is activated (opened or closed) when the moving member is subjected to a "drive" field which is provided by an additional field source (coil or magnet). Current is provided to the field source through wires that perform no secondary function. Inexpensive cameras require a shutter that is reliable, but also minimally expensive to fabricate. Towards that end, if a part can be made to perform more than one function a reduction in cost will follow.

SUMMARY OF THE INVENTION

The present invention is directed to overcoming one or more of the problems set forth above. Briefly summarized, according to one aspect of the present invention there is provided an electromagnetic camera shutter comprising:

an electrically conductive shutter blade having a hole there through;

electrically conductive spring means connected in series with said electrically conductive shutter blade for urging said shutter blade into a first or a second position from a compressed position between said first and said second position;

permanent magnet means having a hole there through and positioned in proximity to said shutter blade such that the shutter blade covers the hole in said permanent magnet when the shutter blade is in the first or the-second position; and control means for applying a current through said springs and said shutter blade in a first direction to generate an electromagnetic field between said shutter blade and said permanent magnet so as to move said shutter blade from said first position to said second position and for applying a current through said springs and said shutter blade in a second direction so as move said shutter blade from said second position to said first position such that the hole in the shutter is positioned over the hole in the permanent magnet during transitions of the shutter between positions.

The invention comprises a novel "moving coil" electromagnetic camera shutter in which the "coil" is in the form of a conductive strip on the blade itself. Compression springs are attached to the blade and serve the dual purpose of controlling the mechanical dynamics of the shutter and providing a series conductive path to the conductive strip on the blade. In addition, the magnet has a hole in it which serves as the camera aperture.

The camera shutter in further detail comprises, a thin rectangular permanent magnet with a hole through it that functions as the aperture for the camera, a moveable shutter blade with a hole in it, a strip of conductive material transversing the blade and surrounding the hole in the blade, compression springs that are attached to the blade and serve as conductive paths to supply current to the conductive strip on the blade, a frame that supports the entire assembly provides guide paths and stops for the blade, and an electrical circuit for activating the shutter.

The operation of the shutter is as follows: In an inactivated state the shutter blade is at rest in one of two positions with its hole to the left or right of the aperture hole in the magnet, respectively, thereby preventing light from passing through the aperture. The compression springs are adapted so that they obtain their natural length in either of the two inactivated positions thereby holding the blade fixed against stops in the frame. To activate the shutter, a shutter button is depressed causing the electric circuit to pulse current through the compression springs which are connected in series with the conductive strip on the shutter blade. When current passes through the conductive strip, it experiences a Lorentz force due to the magnetic field of the magnet. This Lorentz force causes the blade to transverse the magnet moving from its first rest position to the second rest position. During the initial movement of the blade, the springs compress from their natural length thereby storing energy. This process continues until the blade is approximately halfway through its range of motion at which point the hole in the blade aligns with the aperture hole in the magnet thereby exposing any film positioned adjacent to the holes. At this point, the springs are in a state of maximum compression and as the blade moves beyond this point the springs decompress and expend their stored energy causing the blade to accelerate to the second of its inactivated positions even if the current through the conductive strip is turned off after the blade has passed the midpoint of its range of motion. For the next exposure the current through the strip is reversed and the above sequence is repeated in the opposite sense of direction.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The main advantage of this shutter is that it consists of a minimum number of parts, a magnet, a shutter blade, and electronic drive circuitry. The simplicity of the design translates into reduced cost and higher reliability making this suitable for low cost single use cameras. In addition, there is no need for soft-magnetic circuit elements or coils of wire that are common to most other shutter actuators. Therefore, this shutter will weigh less than conventional electromagnetic shutters. The magnet used in the shutter serves both as an energy source and as the aperture thereby eliminating the need for additional aperture materials.

BRIEF DESCRIPTION OF THE DRAWINGS

FIGS. 1A, and 1B, are a cut-away front view of a camera with the shutter in place, and a side view of portions of the shutter, respectively;

FIGS. 2A, and 2B, illustrate the shutter in its opened state in a front and a side view, respectively;

FIGS. 3A, and 3B illustrate the range of motion of the springs connected to the shutter, and the spring energy as a function of the range of motion, respectively; and FIG. 4, illustrates in schematic form the circuitry for controlling the shutter of the present invention.

To facilitate understanding, identical reference numerals have been used, where possible, to designate identical elements that are common to the figures.

DETAILED DESCRIPTION OF THE INVENTION

Referring to FIGS. 1A and 1B, wherein an example of a preferred shutter 10 is shown mounted within a camera 40. The shutter employs a shutter blade 12, with a shutter blade opening (hole) 28, that is slidably mounted in a shutter frame 16 to be guided along two guide grooves 22. The shutter blade 12 is held in abutment with shutter stops 24A and 24B by means of electrically conductive springs 18, when the shutter is at rest in one of two positions, labeled A and C in FIGS. 1A, and 3B. The shutter blade 12 has mounted thereon a conductive strip 14. The conductive strip 14 is formed with a central portion that surrounds the shutter blade opening (hole) 28 and tabs that connect the conductive strip 14 in series with a pair of conductive springs 18. It is also possible to form the shutter blade from conductive material. The conductive strip 14 generates a magnetic field when current flows therethrough. The direction of the magnetic field is determined by the direction that current is caused to flow in the conductive strip. The pair of conductive springs 18 are physically connected to the shutter frame 16 by means of tabs 26. A permanent magnet 20 is mounted to the shutter frame 16 beneath the shutter blade 12 (most clearly shown in FIG. 1B). The permanent magnet 20 is provided with an opening (hole) 30 that is aligned with the shutter blade opening 28 when the shutter blade 12 is in position B. When the conductive strip 14 is energized (current passed through it) the shutter blade 12 is moved to the right by means of the electromagnetic force produced between the conductive strip 14 and the permanent magnet 20. As the shutter moves to the right the springs 18 are compressed from their initial natural length to a point of maximum compression (labeled B in FIGS. 1A, 2A, and 3B) after which the springs 18 decompress to force the shutter blade 12 to continue to the right until stopped by the pair of stops 24b. In a like manner when the shutter blade 12 is at rest in the C position and the current through the conductive strip 14 is reversed the shutter blade 12 will move to the left ending up against the pair of stops 24a at the leftmost limit of its travel. During its travel, the shutter blade opening (hole) 28 will have passed over the permanent magnet hole 30 causing an exposure of film in the preferred utilization of the invention. Current reversal through the conductive strip 14 is controlled by the control circuit 32 which in the preferred embodiment of the invention is actuated by a camera shutter button 42.

FIGS. 2A and 2B illustrate the position of the shutter 10 in the opened position. Thus, by energizing the conductive strip 14 the shutter blade 12 is slid in the direction that opens a light passage through shutter blade opening 28, through the permanent magnet hole 30 in the magnet 20, to the camera's lens system to expose film within the camera 40. The lens system and the film are not shown for purposes of simplicity as their positioning and operation are well known. After the shutter 10 is opened it is urged against the stops 24B by the springs 18 wanting to decompress. The duration of this open condition is controlled by the control circuit 32, illustrated in detail in FIG. 4. As the shutter 10 moves to the right or the left of the central position (position B) the springs 18 are compressed from their initial natural length to a point of maximum compression after which the springs 18 decompress to force the shutter to continue to the right or the left until stopped by the stops 24b or 24a.

Referring to FIGS. 3A and 3B, the spring energy, as a function of shutter position, is illustrated. When the springs 18 are at position A they are at their natural length with substantially no spring energy. As the springs are forced to position B (via activation of conductive strip 14) they are compressed, thereby increasing the spring energy. The springs acquire their maximum spring energy at position B. As the springs continue to move to the right from position B to position C, they decompress, expending their energy, thereby forcing the conductive strip 14 (and attached shutter blade 12, not shown) to the right. At position C, the springs are once again at their natural length and the spring energy is substantially zero. Thus, for example, to open the shutter 10, the conductive strip 14 need only be energized to move the springs from position A to position B after which the inertia of the blade and the springs themselves force the shutter 10 to complete the shutter's movement to position C. The aforementioned procedure is reversed by reversing the current flow through the conductive strip 14 to force the shutter back from position C to position A.

Referring now to FIG. 4, wherein the block schematic for the control circuit 32 is illustrated; a camera battery 34, feeds the capacitor charger circuit 36, which in turn charges capacitor 38, to an energy level which is sufficient to power a complete shutter cycle. The capacitor 38 is also connected to an H-Bridge 50, which is controlled by the H-Bridge control circuit 60. This H-Bridge is comprised of transistors 70, 80, 90, and 100. Upon the control circuitry 60 receiving an exposure command to actuate the shutter blade 12, transistors 70 and 90 are turned "on". This action sends current through the conductive strip 14 in a direction A to move the shutter blade 12 from rest position to the other, opening the shutter 10 at a mid-position. The exposure on the camera's film is thus made and transistors 70 and 90 are then turned "off". For a second exposure transistors 80 and 100 are turned "on" sending current through the conductive strip 14 in a direction B, which, in turn, causes the shutter blade to move from its present rest position back to its initial rest position, which movement opens the shutter at the mid-position. The capacitor charging circuit 36, recharges capacitor 38 at each shutter blade rest position, thus preparing for the next shutter command.

The invention has been described with reference to a preferred embodiment. However, it will be appreciated that variations and modifications can be effected by a person of ordinary skill in the art without departing from the scope of the invention.

| PARTS LIST | |
|---|---|
| 10 | shutter |
| 12 | shutter blade |
| 14 | conductive strip |
| 16 | shutter frame |
| 18 | conductive springs |
| 20 | permanent magnet |
| 22 | guide groves |
| 24A, 24B | shutter stops |
| 26 | tabs |
| 28 | shutter blade opening (hole) |
| 30 | permanent magnet hole |

PARTS LIST

| | |
|---|---|
| 32 | control circuit |
| 34 | camera battery |
| 36 | capacitor charger circuit |
| 38 | capacitor |
| 40 | camera |
| 42 | shutter button |
| 50 | H-bridge |
| 60 | H-bridge control circuit |
| 70 | transistor |
| 80 | transistor |
| 90 | transistor |
| 100 | transistor |

We claim:

1. An electromagnetic camera shutter comprising:

an electrically conductive shutter blade having a hole there through;

electrically conductive spring means connected in series with said electrically conductive shutter blade for urging said shutter blade into a first or a second position from a compressed position between said first and said second position;

permanent magnet means having a hole there through and positioned in proximity to said shutter blade such that the shutter blade covers the hole in said permanent magnet when the shutter blade is in the first or the second position; and control means for applying a current through said springs and said shutter blade in a first direction to generate an electromagnetic field between said shutter blade and said permanent magnet so as to move said shutter blade from said first position to said second position and for applying a current through said springs and said shutter blade in a second direction so as move said shutter blade from said second position to said first position such that the hole in the shutter is positioned over the hole in the permanent magnet during transitions of the shutter between positions.

2. The electromagnetic camera shutter according to claim 1, wherein said control means is comprised of a charged capacitor, H-Bridge, and H-Bridge control circuitry.

3. An electromagnetic camera shutter comprising:

a shutter blade having a hole there through with a conductive strip mounted surrounding the hole for generating a magnetic field when current flows through the conductive strip;

electrically conductive spring means connected in series with said conductive strip for urging said shutter blade to either a first position or a second position from a position corresponding to an open position;

a permanent magnet having a hole there through associated with said shutter blade; and means for applying a current through said conductive spring means and said conductive strip in a first direction for generating an electromagnetic field to move said shutter blade from the first position to the second position and for applying a current through said conductive springs and said conductive strip in a second direction to move said shutter blade from the second position to the first position such that the hole in said shutter is positioned over the hole in the permanent magnet during the movement of the shutter blade between positions.

4. The electromagnetic camera shutter according to claim 3, wherein said means for applying current is a chargeable capacitor.

5. The electromagnetic camera shutter according to claim 3, wherein said means for applying a current is comprised of:

a chargeable capacitor;

an H-bridge for controllably connecting said chargeable capacitor to said conductive strip; and H-bridge control means for controlling the direction of connection of the chargeable capacitor to said conductive strip.

\* \* \* \* \*